E. Woodruff,
Automatic Gate,

Nº 12,652.            Patented Apr. 3, 1855.

UNITED STATES PATENT OFFICE.

ENOS WOODRUFF, OF ELIZABETHTOWN, NEW JERSEY.

MECHANISM BY WHICH APPROACHING VEHICLES OPEN AND CLOSE GATES.

Specification of Letters Patent No. 12,652, dated April 3, 1855.

*To all whom it may concern:*

Be it known that I, ENOS WOODRUFF, of Elizabethtown, in the county of Essex, State of New Jersey, have invented a new and Improved Mode of Operating a Rotating Gate; and I do hereby declare that the following is a full and exact description thereof, reference being had to the drawings and model which accompany this specification and make part thereof.

Figure 1:
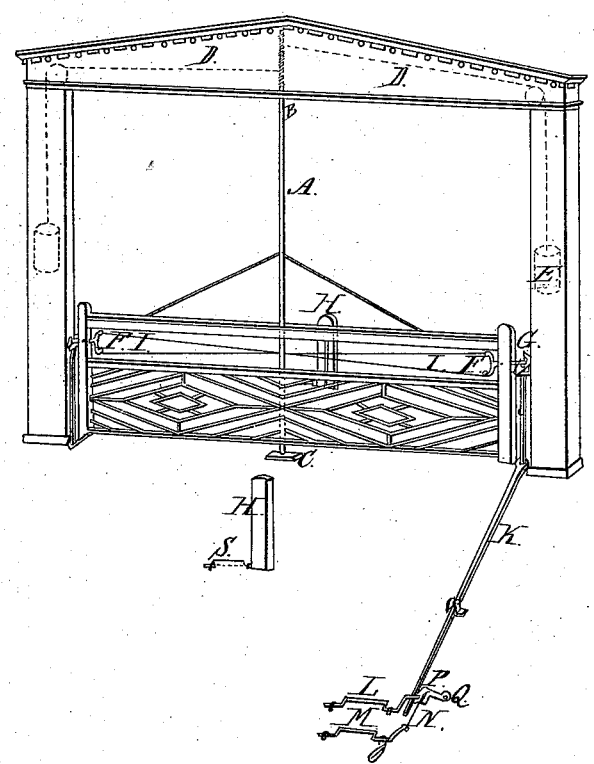
Figure 2:
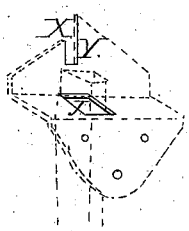

Figure 1 represents a gate to be of any desired pattern, in length sufficient to shut across two carriage ways, said gate being hung upon a round iron bar the ends of which are held one in the top cross piece of the framework as at B and the bottom end C is held by the sill or a block fast in the ground, the bar and the gate revolve together, the upper end of the bar A projects upward into the hollow cornice and has two ropes or chains D attached thereto said ropes or chains passing over pulleys fastened on the top of the hollow uprights of the frame have the weights E suspended on their ends, these weights are wound up by turning the gate round backward. The gate is held shut by the latches F and the catch G a similar catch being upon each post H holds the gate when open. These catches as shown at Fig. 2 are double having one side X higher than the other to stop the gate when closing and at the same time to allow the latch to pass over freely when the gate is turned backward to wind it up. The two latches are caused to lift simultaneously by the cross ties I Fig. 1. An upright rod O passes through the catch G, as at J Fig. 2 up to the under side of the latch, the lower end of this rod is attached to a lever K lying parallel with the carriage way which lever extends to a length to admit a carriage and horse to stand clear of the gate when closed the wheel of the carriage resting upon the crank lever L, this crank lever lying across the wheel track has its end projecting over and resting upon the lever K—the pressure upon K by L causes the upright rod o to lift the latch E out of the catch G the weights causing the gate to commence a rotation, which is stopped and the gate held open by the catches on the posts H.

At the foot of each post H a crank lever S is laid across the wheel track which lifts the latches when the wheel passes over it and allows the weights to close the gate.

As a preventative to the opening of the gate by the tread of an animal a second crank lever M is placed at such a distance from L that the two cannot be trod upon at the same time but near enough to allow a carriage wheel to press upon L before it is clear of M. An iron rod N is attached to a wedge or block P which is fast to the arm Q and moves upon a pin—this block or wedge being under the projecting end of the crank lever L prevents it from pressing upon the long lever K, the carriage wheel by coming first upon M removes the block from under the end of L and allows it to press upon K and lift the latches F and the gate to open.

What I claim as my invention and desire to secure by Letters Patent is—

1. Applying weights in manner specified or any similar manner to the operating the gate.

2. The application to such gates of the manner herein described of causing both latches to lift at the same time.

3. The application of latches with one side higher than the other to a rotating gate.

4. The manner above described of preventing the tread of an animal from opening the gate or any mode analogous thereto.

ENOS WOODRUFF.

Witnesses:
W. M. GOODING, Sr.,
HORACE WOODRUFF,